June 15, 1948.  R. E. HENNESSY  2,443,454
AUTOMOBILE COWL VENTILATOR OPERATING MEANS
Filed May 26, 1944  3 Sheets-Sheet 1
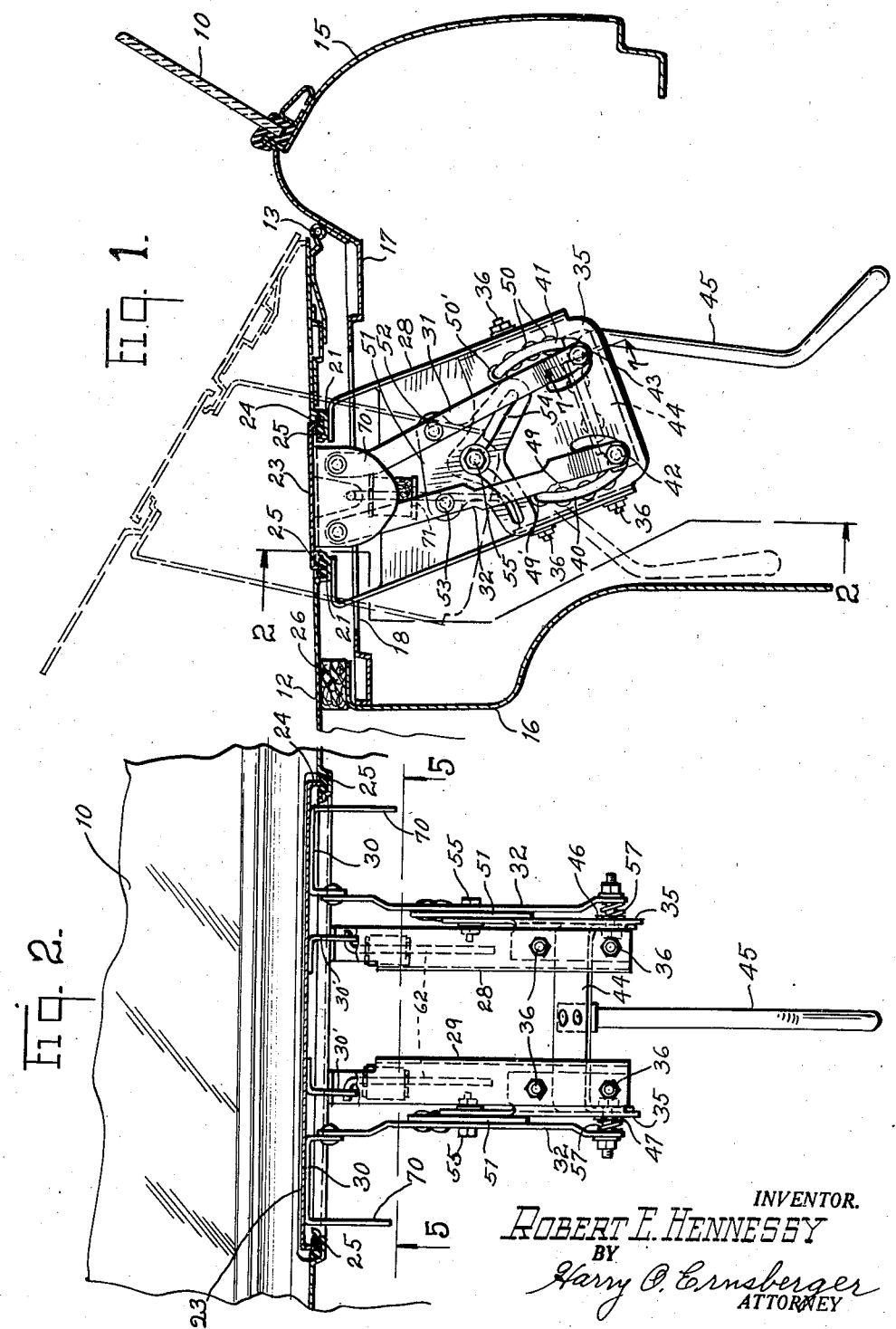
INVENTOR.
ROBERT E. HENNESSY
BY
Harry O. Ernsberger
ATTORNEY June 15, 1948.  R. E. HENNESSY  2,443,454
AUTOMOBILE COWL VENTILATOR OPERATING MEANS
Filed May 26, 1944  3 Sheets-Sheet 2
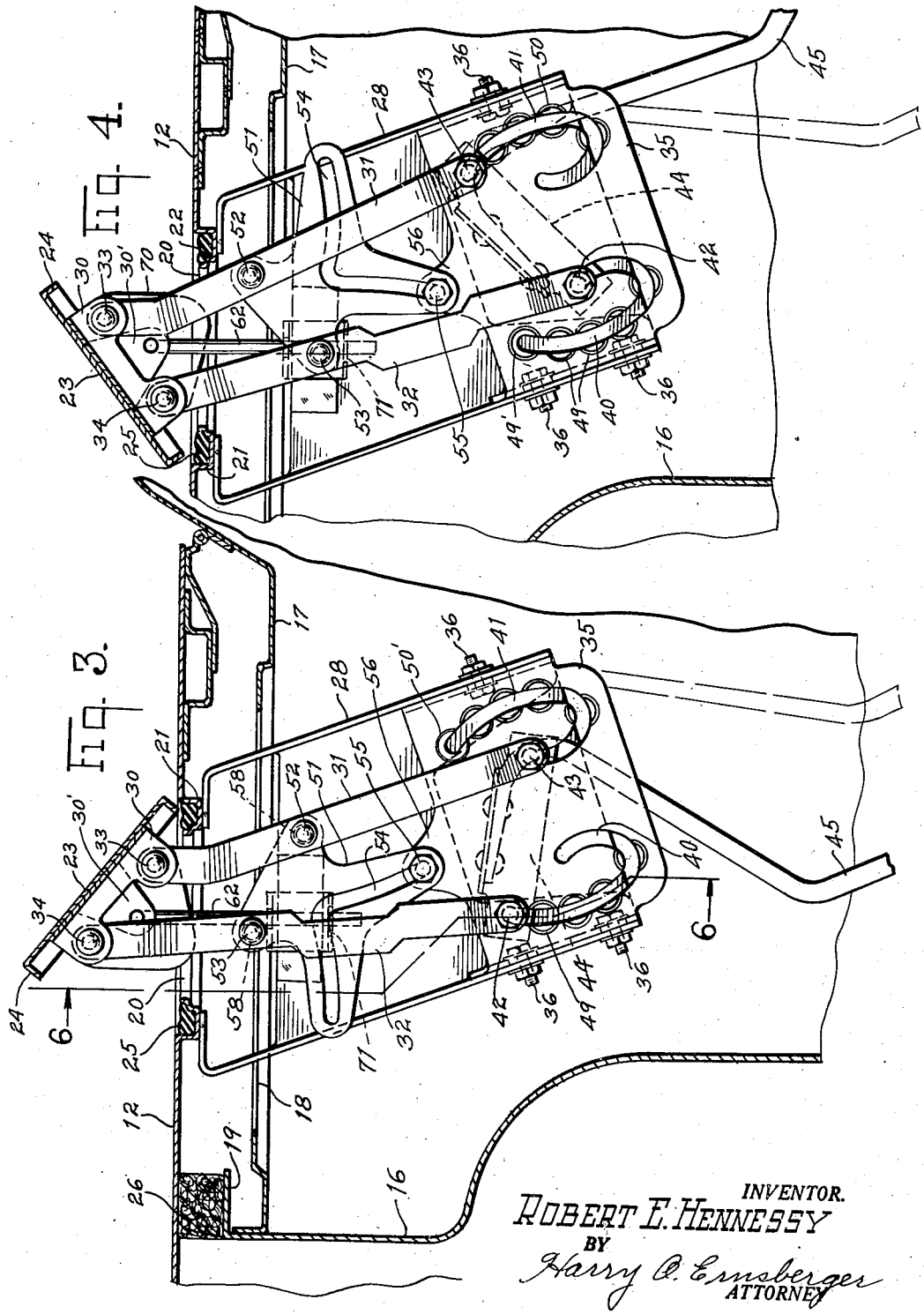
INVENTOR.
ROBERT E. HENNESSY
BY
Harry O. Ernsberger
ATTORNEY June 15, 1948.　　　　R. E. HENNESSY　　　　2,443,454
AUTOMOBILE COWL VENTILATOR OPERATING MEANS
Filed May 26, 1944　　　　　　　　　　　　3 Sheets-Sheet 3
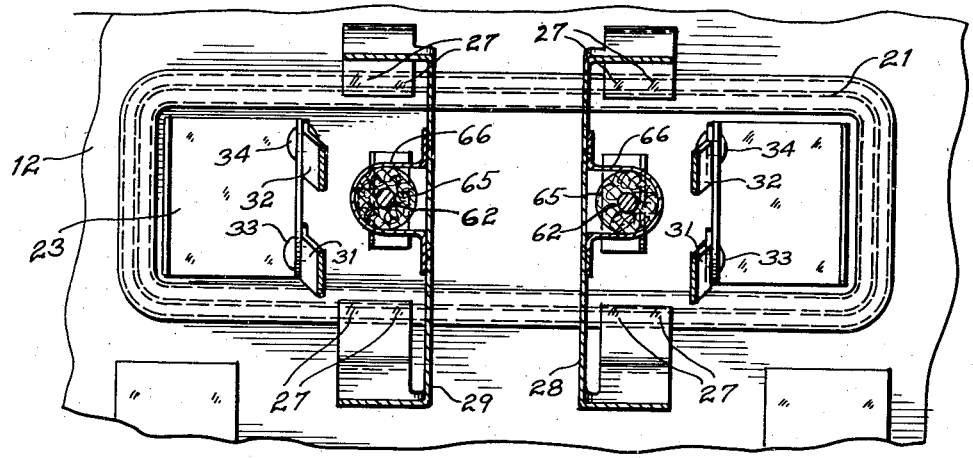
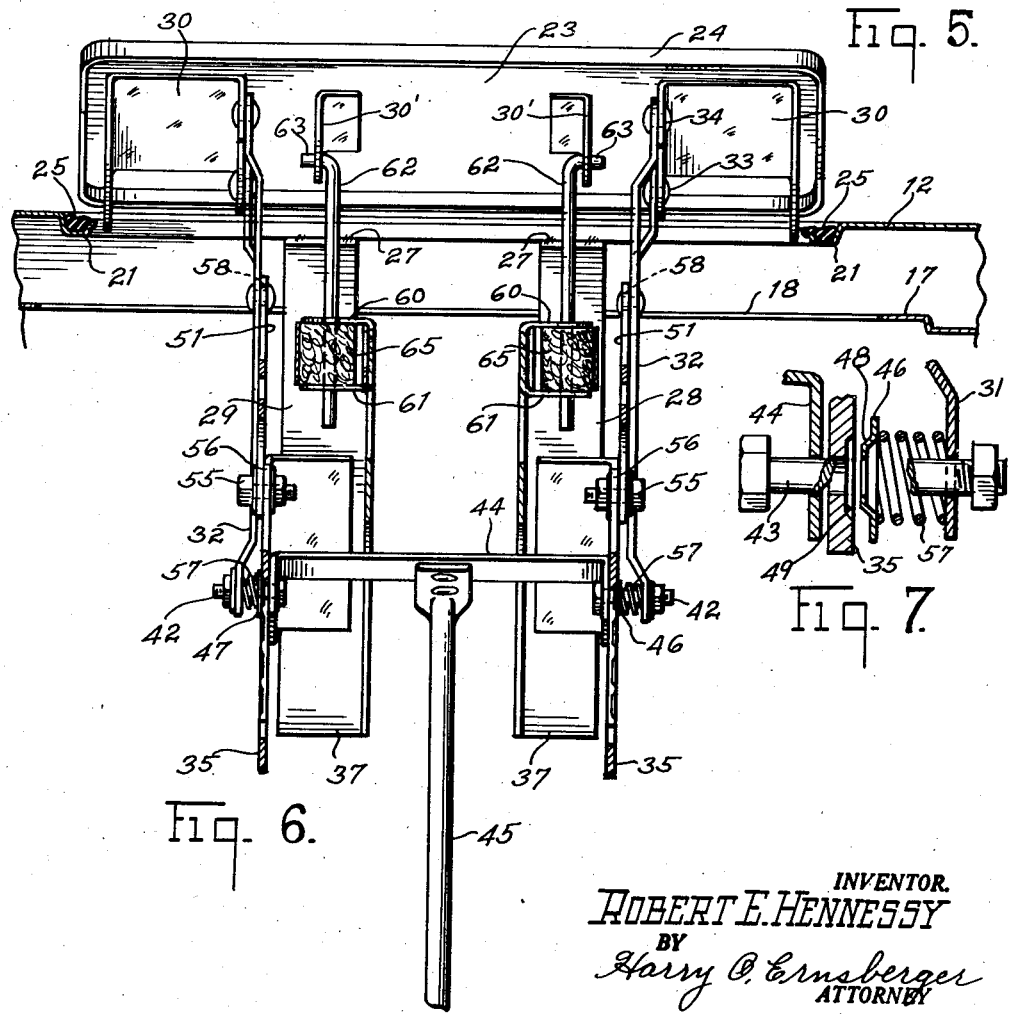
INVENTOR.
*Robert E. Hennessy*
BY
*Harry O. Ernsberger*
ATTORNEY Patented June 15, 1948

2,443,454

UNITED STATES PATENT OFFICE 2,443,454

AUTOMOBILE COWL VENTILATOR OPERATING MEANS

Robert E. Hennessy, Detroit, Mich., assignor to Willys-Overland Motors, Inc., Toledo, Ohio, a corporation of Delaware Application May 26, 1944, Serial No. 537,482

11 Claims. (Cl. 98—2)

This invention relates to ventilating apparatus and more especially to an arrangement for ventilating the body compartment of a vehicle.

The invention comprehends an arrangement especially adapted for ventilating vehicle bodies and the like, the arrangement embodying means for ventilating a compartment by air flow into or out of the compartment.

The invention embraces a means especially adaptable for use with a prime mover body whereby air currents may be directed into or out of the compartment to be ventilated.

An object of the invention resides in the provision of a movable closure for a ventilating opening wherein the closure is rendered adjustable to a plurality of positions whereby air currents may flow into or out of a single ventilating opening by regulating angular adjustment and relative position of the closure.

Another object of the invention is the provision of a closure operating mechanism arranged to move or tilt the closure in opposed directions with respect to the opening normally obstructed by the closure.

A more specific object of the invention resides in the provision of a ventilating apparatus for a vehicle body whereby a closure for a ventilating opening is so mounted as to selectively direct air currents into the vehicle body or away from the body through the ventilating opening, whichever condition may be desirable.

Still another object of the invention is the provision of ventilating apparatus for a vehicle body wherein a closure for a ventilating opening may be alternately swung in opposite directions and through various angularities to regulate the flow of air currents into or away from the vehicle body and at the same time control the amount of air flowing through the ventilating opening.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a longitudinal vertical sectional view through the forward portion of a vehicle compartment illustrating an embodiment of my invention;

Figure 2 is a transverse sectional view taken substantially on the line 2—2 of Figure 1;

Figure 3 is a longitudinal vertical sectional view similar to Figure 1 illustrating the ventilator closure as adjusted to a position for directing air currents into the vehicle body compartment;

Figure 4 is a view similar to Figure 3 showing the closure adjusted to an oppositely disposed position;

Figure 5 is a sectional view taken substantially on the line 5—5 of Figure 2;

Figure 6 is a vertical sectional view taken substantially on the line 6—6 of Figure 3; and Figure 7 is an enlarged fragmentary detail sectional view taken substantially on the line 7—7 of Figure 1 and showing the component elements separated for purposes of illustration.

While I have illustrated my invention as used for ventilating the interior of a vehicle body compartment, it is to be understood that I contemplate the incorporation of my invention in any structure wherever the same may be found to have utility.

Referring to the drawings in detail there is illustrated a forward portion of a vehicle body, numeral 10 designating a windshield of conventional construction, a hood or bonnet 12 being hinged as at 13 to the body construction at the base of the windshield. The bonnet 12 is generally of conventional design adapted to enclose an engine (not shown) and is arranged to pivot upwardly about the axis of hinge 13 for access to the engine compartment. Adjacent the windshield 10 and rearwardly thereof is an instrument panel 15 and forwardly of the instrument panel is a dash member 16. Positioned beneath the hood 12 between the base of the windshield and the dash is a sub-cowl member 17 forming a part of the body construction and defining with the dash 16 a forward compartment portion of the vehicle body. The upper portion of the dash 16 extends laterally forming a flange 19, and secured to the flange is a strip of felt 26 or other suitable material which contacts the lower surface of the bonnet 12 to effectively separate the body compartment from the engine compartment. The member 17 is provided with an opening 18.

The bonnet 12 is formed with a substantially rectangular opening 20 bounded by a depending channel portion 21 formed integrally with the bonnet 12 and configurated so as to provide a recess 22. A closure or cover 23 is adapted to normally close the ventilating opening 20 in the bonnet 12, the closure 23 having a depending peripheral flange 24 adapted to extend into a recess 22 formed by the flange portions 21. Bonded or otherwise secured in the recess 22 is a strip of rubber 25 or other suitable yieldable material which is adapted when the closure 23 is in "closed" position as shown in Figures 1 and 2, to be engaged by flange 24 and thus effectively seal the ventilating opening 20.

My invention is inclusive of means or mechanism for adjusting or moving the closure 23 into opposite disposed angularly arranged positions as indicated in Figures 3 and 4 as well as to positions intermediate the full open positions and its normal closed position. Due to the forward motion of the vehicle, air may enter the body compartment when the closure 23 is in the position shown in Figure 3, or in intermediate positions as hereinafter explained. The closure 23 may be moved or adjusted to the position shown in Figure 4 so that forward movement of the vehicle, sets up air currents moving past the closure 23 resulting in a pressure less than atmospheric pressure adjacent opening 20 in the body compartment, hence causing air to flow out of the body compartment through the ventilating opening 20.

The mechanism for accomplishing these purposes is supported upon a pair of brackets 28 and 29 which are welded as at 27 to the flange configurations 21 bounding the opening 20. Each of the brackets 28 and 29 supports identical sets of links and associated mechanism for moving the closure 23. Welded to the closure 23 are the U-shaped members 30 to each of which are pivotally connected the upper ends of links 31 and 32 by means of rivets 33 and 34. Disposed adjacent the lower portion of each of brackets 28 and 29 are the members or brackets 35. Each of brackets 35 are provided with elongated openings adapted to receive bolts 36 for securing the brackets 35 to the flanges 37 of the supports or brackets 28—29, the elongated slots in members 35 being provided to facilitate adjustment between the supports 28—29 and the members 35 for a purpose to be hereinafter explained. The uniplanar portion of each of brackets 35 is formed with slots 40 and 41, the walls of which provide cam-like surfaces for controlling the movement of links 31 and 32. The lower extremities of the links are adapted to receive bolts 42 and 43 which pass through openings in the links and through the slots 40 and 41 respectively. The bolts 42 and 43 also pass through a member 44 which has a handle or manipulating portion 45 for manipulating the mechanism to regulate the position of closure 23. Also carried upon the bolts 42 and 43 are disc-like washers or members 46 and 47 of identical construction having frustoconical portions 48 as shown in detail in Figure 7 which are adapted for cooperation with conical recesses 49 and 50 formed in bracket 35 spaced along the curved slots 40 and 41. Springs 57 are interposed between the lower ends of links 31 and 32 and the conically shaped members 47 so as to resiliently urge the members 46 and 47 into selective engagement with one of the recesses 49 or 50 to maintain the closure 23 through the medium of the positioning links 31 and 32 in any one of a plurality of selected positions determined by engagement of members 46 or 47 in one of the recesses 49 or 50.

In order to properly maintain links 31 and 32 in operative relationship in moving the closure 23 to its various positions, the links 31 and 32 are connected to a member 51 by means of rivets 52 and 53. Member 51 is formed with a depending Y-shaped portion provided with a cam slot 54 through which projects a stud bolt 55 carried by an upwardly projecting portion 56 formed integrally on bracket 35. Openings 58 in members 51 to accommodate rivets 52 and 53 are made slightly larger than the rivets 52 and 53, as shown in Figures 3 and 6, permitting slight relative motion between the links 31 and 32 and member 51 to eliminate any binding of the mechanism during operative movements thereof.

Each of the brackets 28 and 29 is formed with laterally extending ears 60 and 61 provided with openings to slidably receive a guiding means or rod 62, the upper laterally projecting portion 63 of the rod extending through an opening in bracket 30' secured to closure 23. The openings in the ears 60 which accommodate passage of rod 62 are made slightly larger than the diameter of the rod, and the openings in the ears 61 are elongated at 71 to permit a small swinging movement of the rod as the closure is moved to its various positions. In order to eliminate noise which might arise by reason of such lost motion between the rod 62 and the ears 60 and 61, I have surrounded each of the rods with a block of felt 65 or other suitable resilient or yieldable material disposed between the ears 60 and 61. The felt blocks 65 are secured in place by means of yokes 66 formed of sheet metal, the extremities of the latter being welded to members 28 and 29. It should be noted that all of the mechanism and supporting means are carried upon the hood or bonnet 12 and when the latter is elevated the closure 23 and its operating mechanism are also moved to elevated position with the hood. It is to be understood that the arrangement of my invention may be incorporated directly in a cowl portion of a vehicle wherein the cowl portion is independent of the bonnet construction.

The operation of my invention is as follows. As illustrated in Figure 1, the closure 23 being in closed position, the bolts 42 and 43 are disposed in slots 40 and 41 respectively at the lowest point thereof while the bolt 55 projects through the cam slot 54 at its central or highest point. If the operator desires to receive air flow of outside air into the body compartment, he grasps the handle portion 45 and exerts a clockwise pressure thereon as viewed in Figure 1, which causes the bolts 42 and 43 to traverse slots 40 and 41 respectively to the position shown in Figure 3 with the closure 23 moved to full open position, the opening being toward the front of the vehicle. In this position the member 51 has shifted its relative position as shown in Figure 3 but maintains the links 31 and 32 in proper relationship throughout their movement from one position to another. If an intermediate or partially open position of closure 23 is desired, the handle 45 is moved until disc-like members 57 surrounding bolts 42 engage in a pair of recesses 49 in plates or brackets 35, the springs 57 resiliently or frictionally retaining the members 47 in the selected recesses and maintaining the closure in partial open position. When the disc-like member 47 engages the uppermost recess 49' at the end of slot 40, the closure 23 is then in full open position. The movements of the closure are controlled or properly guided by reason of the rods 62 and their cooperation with the felt blocks 65.

When the operator desires to utilize the moving air currents outside of the vehicle compartment to withdraw air from the interior of the body compartment, he grasps manipulating handle 45 and, exerting counter-clockwise pressure thereon as viewed in Figure 1, causes the mechanism to assume the position shown in Figure 4 with the closure 23 in full open position but in a reverse angular direction from that shown in Figure 3. In this position the cone-shaped portions of discs 46 rest in uppermost recesses 50' formed at the upper ends of slots 41 so that the closure 23 is resiliently or frictionally maintained in full open position. Whenever it is desired to retain the closure 23 in partial open position for withdrawing air from the body compartment, the handle 45 may be manipulated to engage discs 46 with any selected pair of the recesses 50 in plates 35. It should be noted that the closure 23, in any open position is disposed at one side of the wall of the body compartment being ventilated. The members 35 are each formed with a depending vane 70 which functions, when the closure is in open position, as an aid in directing air into or away from the body compartment.

In assembly, it is desirable that the rubber strip 25 be slightly compressed against the flanged configuration 21 formed on the hood. To accomplish this, and to predetermine the normal proper closed position of closure 23, the bolts 36 are loosened and the bracket 35 moved downward longitudinally and relatively to members 28 and 29 until closure 23 is in the position shown in Figure 1, after which bolts 36 may be tightened to secure the mechanism and various elements thereof in proper relationship.

It is apparent that, within the scope of the invention modifications and different arrangements may be made other than is herein disclosed, and the present disclosure is illustrative merely, the invention comprehending all variations thereof.

What I claim is:

1. In combination, a ventilating means for a vehicle body compartment having an opening; a closure therefor; a bracket secured to a wall of the compartment adjacent the opening; a pair of links pivotally connected with said closure; a member fixedly secured to said bracket and formed with a cam slot; means associated with said links and arranged for cooperation with said cam slot for controlling the movement of said links; manipulating means associated with said links for moving the latter with respect to said cam slot to cause angular movement of said closure in either of two directions; and resilient means associated with the means cooperating with the cam slot for retaining said closure in angularly adjusted positions with respect to the plane of the opening in the compartment.

2. In combination, a ventilating means for a vehicle body compartment having an opening; a closure therefor; a bracket secured to a wall of said compartment; linkage pivotally connected with said closure; a member carried by the vehicle body and having a pair of slots therein, means associated with said linkage cooperating with slots in said member; a second member connected to said linkage and having a slot therein; means on said bracket extending into the slot in said second member for controlling relative movement thereof; and manipulating means associated with said linkage to cause bodily movement of said closure in either of two directions with respect to the compartment wall.

3. In combination, ventilating means for a vehicle body compartment having an opening; a closure therefor; a pair of links pivotally connected with said closure; a relatively stationary member carried by the vehicle body and having a pair of slots therein, means carried by said links cooperating with the slots in said member; a guiding member connected with said links for controlling relative movement thereof; a manipulating member associated with said links for moving the latter to cause bodily movement of said closure in either of two directions; and means including recesses in said member adapted to be engaged by the means cooperating with the slots in said member for retaining said closure in angularly adjusted positions with respect to the plane of the opening in said body compartment.

4. In combination, ventilating means for a compartment having an opening; a closure therefor; a bracket secured to a wall of said compartment; a pair of links pivotally connected with said closure; a relatively stationary member having a pair of slots therein; means associated with said links and extending into the slots in said member; a control member having a slot therein; means on said bracket extending into the slot in said second member for controlling relative movement thereof; a manipulating member associated with said links for moving the latter and said control member to cause angular movement of said closure in either of two directions; and means including recesses formed in said relatively stationary member and cooperating with the means extending into the slots in said member for resiliently retaining said closure in angularly adjusted positions with respect to the plane of the opening in said body compartment.

5. In combination, ventilating apparatus for a walled compartment having an opening; a relatively movable closure therefor; a relatively stationary member fixedly associated with a wall of the compartment and formed with a cam surface; means including a pair of links pivotally connected to said closure and arranged for cooperation with the cam surface on said relatively stationary member; and guiding means associated with said closure and articulately connected to said links for maintaining said closure in proper relationship with respect to the opening in the compartment when said closure is moved to various positions to ventilate the compartment.

6. In combination, ventilating apparatus for a vehicle body compartment having an opening; a relatively movable closure therefor; a relatively stationary member formed with a cam surface; means including a link pivotally connected to said closure and cooperating with the cam surface on said relatively stationary member; manipulating means for actuating said link; and guiding means pivotally connected to said link for maintaining said closure in proper relationship with respect to the opening in the compartment when said closure is moved to various positions to ventilate the body compartment.

7. In combination, ventilating apparatus for a vehicle body compartment having an opening; a relatively movable closure therefor; a relatively stationary member mounted upon a wall of the compartment and formed with a pair of cam surfaces; means including a pair of links pivotally connected to said closure and cooperating with the cam surfaces on said relatively stationary member; manipulating means for actuating said links; guiding means including a plate pivotally connected to said links and having an operative connection with said relatively stationary member for maintaining said closure in proper relationship with respect to the opening in the compartment when said closure is moved to various positions to ventilate the body compartment, and resilient means for yieldingly retaining said closure in various positions of adjustment.

8. In combination, a ventilating apparatus for vehicle body compartment having an opening; a relatively movable closure therefor; a relatively stationary member formed with a pair of slots; the walls bounding said slot forming cam surfaces; means including a pair of links pivotally connected at spaced points to said closure and cooperating with the cam surfaces for adjusting said closure into angular positions at one side of the compartment wall; said cam surfaces being of a contour whereby initial movement of the connecting means with the closure in closed position disengages the closure from the compartment wall and another portion of said cam surfaces causing subsequent tilting movement of the closure with respect to the plane of the compartment wall, said closure being movable in all positions at one side of the compartment wall and out of contact with the body compartment in all open positions.

9. In combination, a ventilating apparatus for a vehicle body compartment having an opening; a relatively movable closure therefor; a support carried by the compartment wall; an element mounted upon said support and having a pair of cam slots therein; a pair of links pivotally connected to said closure; means associated with said links and adapted to travel in said slots; a control member pivotally connected to said links and having a slot therein; a member carried by said element and extending into the slot in said control member; means associated with said links for actuating the latter and the closure to various angular positions with respect to the compartment opening; a plurality of depressions formed adjacent said cam slots; means arranged for cooperation with said depressions for yieldingly retaining the closure in selectively adjusted positions; and a manipulating member associated with said links for adjusting said closure.

10. In combination, a ventilating apparatus for a vehicle body compartment having an opening; a relatively movable closure therefor; a support carried by the compartment wall; a bracket mounted upon said support and having a pair of cam slots therein; a pair of links pivotally connected to said closure; means associated with said links and adapted to travel in said slots; a control element pivotally connected to said links and having a slot therein; a member carried by said bracket extending into the slot in said control element; means associated with said links for actuating the closure to various angular positions with respect to the compartment opening; means for yieldingly retaining the closure in selectively adjusted positions; said bracket being adjustable with respect to said support whereby the closure and linkage may be assembled in proper relationship with respect to the compartment wall.

11. In combination, ventilating apparatus for a vehicle body compartment having an opening; a relatively movable closure therefor; a pair of supports carried by the compartment wall; a bracket mounted upon each support and having a pair of cam slots therein; two pairs of links pivotally connected to said closure; means associated with said pairs of links and adapted to traverse said slots; a pair of control members; each control member being pivotally connected to one of said pairs of links and having a slot therein; a relatively stationary member mounted on each support and extending into the slot in its adjacent control member; means connecting said pairs of links for moving the closure to various angular positions with respect to the compartment opening; a plurality of depressions formed adjacent said cam slots; and means arranged for cooperation with said depressions for yieldingly retaining the closure in selectively adjusted positions.

ROBERT E. HENNESSY.

REFERENCES CITED

The following references are of record in the file of this patent:

UNITED STATES PATENTS

| Number | Name | Date |
|---|---|---|
| 339,138 | Brown | Apr. 6, 1886 |
| 1,654,715 | Affleck et al. | Jan. 3, 1928 |
| 1,937,952 | Galamb | Dec. 5, 1933 |
| 2,070,113 | Burgess | Feb. 9, 1937 |
| 2,093,036 | Dickason | Sept. 14, 1937 |
| 2,177,994 | Person | Oct. 31, 1939 |

FOREIGN PATENTS

| Number | Country | Date |
|---|---|---|
| 433,896 | Great Britain | Aug. 22, 1935 |